United States Patent Office 3,197,497
Patented July 27, 1965

3,197,497
ALLENIC PHOSPHORUS DERIVATIVES
Victor Mark, Olivette, Mo., assignor to Monsanto Company, St. Louis, Mo., a corporation of Delaware
No Drawing. Filed Mar. 16, 1962, Ser. No. 180,350
15 Claims. (Cl. 260—461)

This invention relates to allenic (1,2-propadienyl) phosphorus derivatives as new chemical compounds. It relates in particular to allenyl phosphonic and allenyl phosphinic acid derivatives and to allenyl phosphine oxides and methods for their preparation.

The new structures may be represented by the following general formula

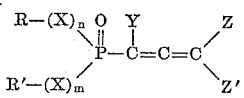

wherein each X is selected from the class consisting of —O—, —S—, —NH—, and —NR″—; wherein R, R′ and R″ are organic radicals selected from the class consisting of the hydrocarbon radicals of the class consisting of the alkyl radicals having up to 18 carbon atoms, such as methyl, ethyl, hexyl, dodecyl and octadecyl; the alkenyl radicals having up to 18 carbon atoms, especially those having up to four carbon atoms, such as vinyl, allyl, octenyl, dodecenyl and 9-octadecenyl; the alkynyl radicals having up to 18 carbon atoms, such as ethynyl, propargyl, decynyl and octadecynyl; the aryl radicals, such as phenyl, naphthyl and methylphenyl; and the cycloaliphatic hydrocarbon radicals having from 5 to 7 carbon atoms, such as cyclohexyl, cyclohexenyl, cyclopentadienyl and cycloheptenyl; the heterocyclic radicals, such as furyl, furfuryl, thienyl, piperidyl, thenyl and morpholyl radicals, and the said hydrocarbons containing substituents of the class consisting of alkyl radicals having up to four carbon atoms, alkoxy radicals having up to four carbon atoms, nitro, cyano, phenyl, methylphenyl, chlorine and bromine, such as in chloroethyl, nitrobutyl, 3-cyanopropyl and 9,10-dibromooctadecyl radicals; wherein Y is selected from the class consisting of hydrogen and the said R radicals; wherein $m$ and $n$ are integers from zero (0) to one (1); and wherein Z and Z′ are selected from the class consisting of the Y radical as defined.

Following the current nomenclature convention the following new structures are comprised in the present invention (R indicates hydrocarbon radicals):

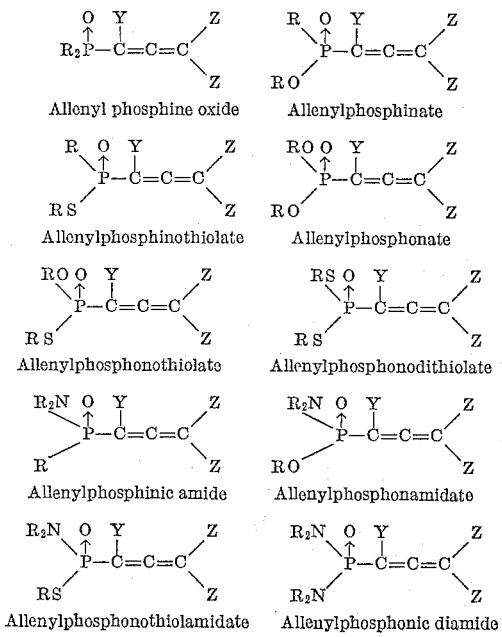

As it will be illustrated with several examples, this invention has as its object all ten of the above categories, being that these products are of a novel and unusual rearrangement reaction which yields the allenic structures in a simple one-step method.

A second object of this invention is thus the unique method for the preparation of the allenic phosphorus derivatives. This method consists in subjecting suitable acetylenic derivatives of trivalent phosphorus to a rearrangement reaction represented by the following general equation:

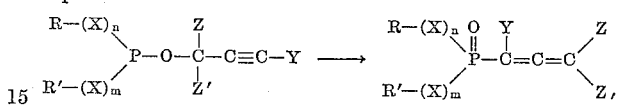

where the symbols R, R′, X, Y, Z, Z′, $m$ and $n$ are as defined above. The starting phosphorus esters can be obtained by methods analogous to those well known in the art, especially by the condensation of a suitable phosphorus halide with the corresponding acetylenic alcohol, usually in the presence of an acid binding agent, often a tertiary amine. A usual preparation of the starting material can thus be represented:

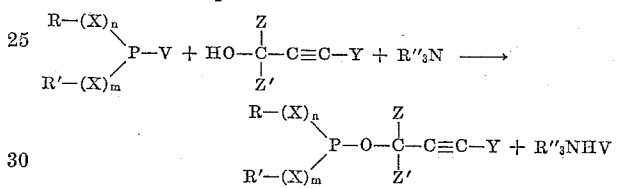

where the symbols R, R′, X, Y, Z, Z′, $m$ and $n$ are as defined above and V is a halogen atom.

In effecting the above reaction any of a broad class of hydrogen halide acceptors may be used, preferred classes being the alkali metal salts of alcohols and tertiary amines such as dimethyl aniline, triethyl amine, trimethyl amine and pyridine.

The rearrangement of the acetylenic esters of the trivalent phosphorus can be best effected thermally, that is, by heating the ester to a temperature at which the rearrangement proceeds at a convenient rate. Depending on the nature of the substituents on both the phosphorus and the acetylenic alcohol moieties, the useful temperature range encompasses that of about −70 to +200° C. and its wide spread reflects the great effect of the substituents on the rate of the rearrangement reaction. These acetylenic esters are under certain conditions unstable, but for each ester there is a threshold temperature below which they are stable to decomposition. In the practice of this invention the acetylenic esters are prepared at a terperature below the threshold temperature, that is, at a temperature at which the esters are stable. The stability of the esters is a chemical property which can readily be determined for any combination of ester and temperature. Once the stable range is ascertained the rearrangement can readily be effected by generating the ester under stable conditions and then gradually increasing the temperature until the rearrangement takes place.

The rearrangement reaction often is highly exothermic and care must be taken in such cases to keep it under control. If left uncontrolled, the heat of the reaction might cause the rearrangement to take place with explosive violence and with the ignition of the products. Often therefore the rearrangement is carried out by exposing only small portions of the phosphorous ester to rearrangement conditions and adding the rest of the sample to the rearranged product in small portions and never allowing the phosphorous ester to accumulate to any great extent. Once the rearrangement has taken place, the mixture can be handled safely, due to the relative stability of the allenic derivatives.

The rearrangement reaction can be carried out both in the presence and in the absence of solvents. Solvents with a boiling range of the selected reaction temperature are often used to moderate the heat of the reaction by internal cooling. Due to the sensitivity of the trivalent phosphorus ester to oxidation, the rearrangement reaction is best carried out in an inert environment, such as under nitrogen, carbon dioxide, methane, or other inert gas.

Since the rearrangement reaction takes place without the formation of co-products, no special workup of the reaction mixture is necessary. The allenic derivatives are obtained in high yield and purity and can be used directly If desired, the usual purification procedures, such as distillation, recrystallization, chromatography, etc. can be applied.

The new chemical compounds represent a new class of organophosphorus derivatives and show highly characteristic physical and chemical properties. An infallible way to identify and characterize the new structures is by their characteristic infrared absorption at 5.0–5.2 microns (1923–2000 wave numbers). The lower members are distillable, colorless liquids or solids. Due to the reactivity of the allenic moiety, these phosphorus derivatives are reactive and valuable chemical intermediates for the preparation of pesticides, plasticizers, polymeric materials, flame proofing agents and the like. By varying addition reactions to the allenic unsaturation a large variety of new and useful structures can be prepared.

The new phosphorus compounds and the rearrangement reaction yielding them are shown in the following examples, which are intended solely for purposes of illustration and are not to be construed as in any way limiting the scope of this invention.

EXAMPLE I

*Diethyl propadienylphosphonate*

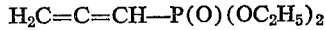

$H_2C=C=CH-P(O)(OC_2H_5)_2$

To a solution of 156.6 g. of diethyl phosphorochloridite in 2 liters of ether there was added slowly a solution of 56.1 g. of propargyl alcohol (2-propyn-1-ol) and 101.2 g. of triethylamine in 1 liter of ether, while stirring vigorously and keeping the temperature of the reaction mixture between 0 and 5°. After the completion of the addition, which required 4 hours, the white slurry of the amine hydrochloride was filtered off by suction, the filter cake washed twice with ether and the pale yellow filtrate analyzed by infrared spectroscopy. Strong absorption at 3.0 and at 4.7 micron and the absence of absorption at 5.0–5.2 and 7.9–8.1 microns indicated the presence of diethyl propargyl phosphite, $(C_2H_5O)_2P(OCH_2C\equiv CH)$ and the absence of the allenyl derivative. The clear solution was added dropwise to a 1 liter three neck flask, provided with stirrer, distillation head for the take-off of solvent and dropping funnel, and heated on a steambath. The addition was carried out at a rate slower than the distillation of ether, thus allowing the phosphite to be heated in small portions at about 90–100° C. After the completion of the addition the yellow solvent-free oil in the flask was analyzed by infrared spectroscopy. Strong absorption at 5.0–5.2 and 7.9–8.1 microns indicated the presence of the 1,2-propadienyl (allenyl) and phosphoryl (P=O) moieties and the absence of absorption at 3.0 and 4.7 microns indicated the absence of the terminal acetylenic structure. The transformations can thus be indicated by the following equations:

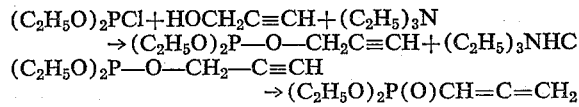

$(C_2H_5O)_2PCl + HOCH_2C\equiv CH + (C_2H_5)_3N$
$\rightarrow (C_2H_5O)_2P-O-CH_2C\equiv CH + (C_2H_5)_3NHC$
$(C_2H_5O)_2P-O-CH_2-C\equiv CH$
$\rightarrow (C_2H_5O)_2P(O)CH=C=CH_2$ Physical properties and nuclear magnetic resonance spectroscopy confirm the structure of diethyl propadienylphosphonate, which is a colorless liquid, boiling at 90° C. at 0.4 mm. and having $n_D^{25}$ 1.4544.

Calculated for $C_7H_{13}O_3P$: C, 47.6; H, 7.4; P, 17.6%. Found: C, 46.6; H, 7.7; P, 17.5%.

EXAMPLE II

*Diethyl 1,2-butadienylphosphonate*

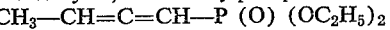

$CH_3-CH=C=CH-P(O)(OC_2H_5)_2$

The procedure of Example I was repeated except that the equivalent amount of 3-butyn-2-ol was substituted for 2-propyn-1-ol. The rearrangement of the intermediate 3-butyn-2-yl diethyl phosphite yielded, after the thermal treatment, ethyl 1,2-butadienylphosphonate in form of a colorless liquid having a boiling point of 105° at 1.0 mm. and $n_D^{25}$ 1.4514.

Calculated for $C_8H_{15}O_3P$: P, 16.3%. Found: P, 15.5%.

EXAMPLE III

*Diethyl 1-methylpropadienylphosphonate*

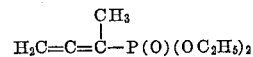

Repeating the procedure of Example I with 2-butyn-1-ol instead of 2-propyn-1-ol yielded, through the intermediate 2-butyn-1-yl diethyl phosphite, $n_D^{25}$ 1.4390, diethyl 1-methylpropadienylphosphonate, B.P. 73° at 0.1 mm., $n_D^{25}$ 1.4587.

Calculated for $C_8H_{15}O_3P$: P, 16.3%. Found: P, 15.5%.

EXAMPLE IV

*Diethyl(2-cyclopentylidenevinyl)phosphonate*

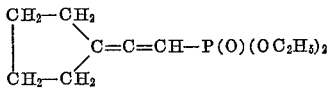

When 2-propyn-1-ol of Example I was replaced with the equivalent quantity of cyclopentyl ethynyl carbinol a high yield of diethyl (2-cyclopentylidenevinyl)phosphonate, B.P. 135° at 0.1 mm., $n_D^{25}$ 1.4738 was obtained.

EXAMPLE V

*Diethyl 3-methyl-1,2-butadienylphosphonate*

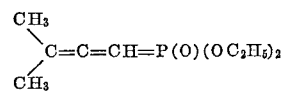

Substitution of equimolecular quantity of 2-methyl-3-butyn-2-ol, $HC\equiv CC(CH_3)_2OH$, for 2-propyn-1-ol of Example I produced in high yield ethyl 3-methyl-1,2-butadienylphosphonate, B.P. 95°/0.7 mm., $n_D^{25}$ 1.4588.

EXAMPLE VI

*Diethyl 2-cyclohexylidenevinylphosphonate*

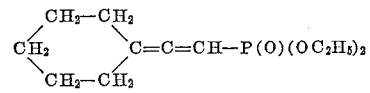

Repeating the procedure of Example I with cyclohexyl ethynyl carbinol in place of 2-propyn-1-ol yielded diethyl (2-cyclohexylidenevinyl)phosphonate, $n_D^{25}$ 1.4736.

EXAMPLE VII

*Dimethyl 3-(2-thienyl)propadienylphosphonate*

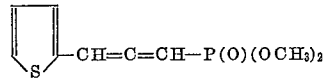

Substituting ethynyl 2-thienyl carbinol for 2-propyl-1-ol and dimethyl phosphorochloridite for diethyl phosphorochloridite in Example I produced a high yield of dimethyl 3-(2-thienyl)propadienylphosphonate in form of a yellow oil, the infrared spectrum of which had a strong absorption at 5.1 microns.

EXAMPLE VIII

*Bis(2-propynyl)propadienylphosphonate*

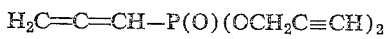

To a solution of 56.1 g. of 2-propyn-1-ol and 101.2 g. of triethylamine in 1 liter of ether, cooled to +2°, there was added slowly and with good stirring a solution of 45.8 g. (0.33 mole) of $PCl_3$ in 500 ml. of ether, keeping the temperature below +5° during the addition. The resultant slurry was filtered by suction, the filter cake rinsed with ether and the resultant colorless solution was analyzed by infrared spectroscopy. This indicated the presence of strong bonds at 3.05 and 4.7 microns, thus indicating that tris(2-propynyl)phosphite,

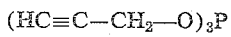

was present in the ether solution. The rearrangement of this phosphite to the dipropargyl propadienylphosphonate was carried out by adding slowly the ether solution to a flask on the steam bath and distilling off immediately the ether solvent. The resultant pale yellow oil was again analyzed by infrared spectroscopy; this indicated the presence of a strong bond at .05 micron, and also at 3.05 and 4.7 microns, thus indicating that the product consisted of dipropargyl propadienylphosphonate,

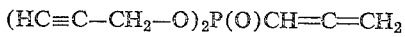

This highly unsaturated phosphorus compound had a boiling point of 117° at 0.34 mm. and a refractive index of 1.4857 at 25°.

EXAMPLE IX

*Diethyl 3-phenylpropadienylphosphonate*

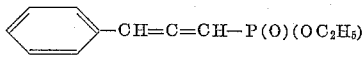

The procedure of Example I was repeated except that ethynyl phenyl carbinol was substituted in equivalent amounts for 2-propyn-1-ol. Heat treatment of the ether extract yielded diethyl 3-phenylpropadienylphosphonate in form of a pale yellow oil.

EXAMPLE X

*Diethyl 3-phenyl-1,2-butadienylphosphonate*

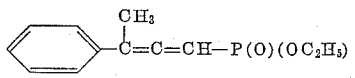

The procedure of Example I was repeated with ethynyl methylphenyl carbinol being substituted for 2-propyn-1-ol. Workup of the ether solution yielded diethyl 3-phenyl-1,2-butadienylphosphonate in form of a pale yellow oil.

EXAMPLE XI

*2-propynyl ethylpropadienylphosphinate*

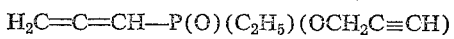

A solution of 21.2 g. of ethylphosphonous dichloride, $C_2H_5PCl_2$, in 20 ml. of ether was added slowly to a solution of 18.2 g. of 2-propyn-1-ol and 32.8 g. of triethylamine in 400 ml. of ether while keeping the temperature between 0 and +5°. After filtration of the triethylamine-hydrochloride precipitate the clear ether solution was stripped from the solvent and the residual oil distilled. A pale yellow oil, boiling between 107 and 108° at 0.3 mm. was obtained in 80% yield, having $n_D^{25}$ 1.5070 and an infrared spectrum with strong bonds at 3.05, 4.7, 5.1 and 8.25 microns, thus indicating the 2-propynyl ester of ethylpropadienylphosphinic acid.

EXAMPLE XII

*Dimethylpropadienylphosphine oxide*

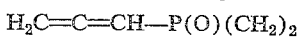

To a solution of 8.9 g. of dimethylphosphinous chloride in 300 ml. of ether there was added, slowly and with good cooling, a solution of 5.2 g. of 2-propyn-1-ol and triethyl-amine in 100 ml. of ether. The resultant slurry was filtered by suction and the pale yellow ether solution evaporated to dryness. A white crystalline solid, melting between 58 and 60° was obtained, the infrared spectrum of which indicated the presence of a strong bond at 5.15 microns, characteristic of the allenic unsaturation. The phosphoryl absorption occurred at 8.5 microns.

EXAMPLE XIII

*S,S-dimethyl propadienylphosphonodithioate*

The procedure of Example I was exactly repeated except that the equivalent amount of dimethyl phosphorochloridodithioite $(CH_3S)_2PCl$, was substituted for diethyl phosphorochloridite $(C_2H_5O)_2PCl$. Workup of the yellow reaction product by filtration stripping and fractionation yielded pure S,S-dimethyl propadienylphosphonodithioate, having a refractive index of $n_D^{25}$ of 1.5980 and boiling point of 100–105° at 0.3 mm.

EXAMPLE XIV

*N,N,N',N'-tetramethylpropadienylphosphonic diamide*

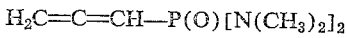

When tetramethylphosphorodiamidous chloride,

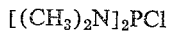

was substituted for the equivalent amount of diethyl phosphorochloridite $(C_2H_5O)_2PCl$, and the procedure of Example I was repeated, a 70% yield of pure N,N,N',N'-tetramethylpropadienylphosphonic diamide was obtained in form of a pale yellow oil, boiling between 85 and 88° at 0.17 mm. and having a refractive index of $n_D^{25}$ 1.5046.

EXAMPLE XV

*Bis(2-chloroethyl)(1,3-dimethyl-1,2-butadienyl) phosphonate*

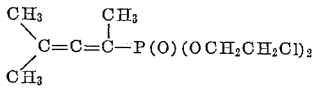

The procedure of Example I was carried out but the equivalent amounts of bis(2-chloroethyl)phosphorochloridite and 2-methyl-3-pentyn-2-ol

being substituted for diethyl phosphorochloridite and 2-propyn-1-ol, respectively. After the heat treatment of the ether extract bis(2-chloroethyl)(1,3-dimethyl-1,2-butadienyl)phosphonate was obtained in form of a high boiling pale yellow oil, which had the characteristic infrared absorption bands of the allenic system at 5.1 microns and of the phosphoryl group at 8.2 microns.

The embodiments of the invention in which an exclusive property or privilege is claimed are defined as follows:

1. The method of preparing a compound of the structure

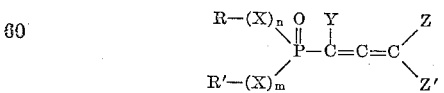

wherein each X is selected from the class consisting of —O—, —S—, —NH— and —NR''—; wherein R, R' and R'' are each a member of the group consisting of alkyl, alkenyl, alkynyl, phenyl, naphthyl, alkylphenyl, cycloaliphatic and chlorine, bromine cyano nitro and alkoxy substituted derivatives thereof wherein alkyl, alkenyl and alkynyl have 1 to 18 carbon atoms, cycloaliphatic has 5 to 7 carbon atoms, and alkoxy has 1 to 4 carbon atoms; wherein Y is selected from the class consisting of hydrogen and R; wherein $m$ and $n$ are integers from 0 (0) to to one (1); and wherein Z and Z' are selected from the class consisting of Y, and such that Z and Z' together form an alkylene radical of four to eight carbon atoms; which comprises reacting a compound of the structure

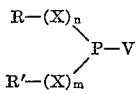

wherein V is a halogen atom with a propargyl alcohol of the structure

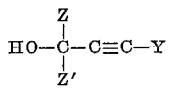

in the presence of a hydrogen halide acceptor of the class consisting of the alkali metal salts of alcohols, the trialkyl amines, dimethyl aniline and pyridine at a temperature at which the proparyl thus formed is stable and gradually heating to induce the rearrangement.

2. The method of preparing a compound of the structure

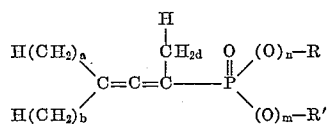

wherein R and R' are alkyl having from one to ten carbon atoms; wherein $a$, $b$ and $d$ are integers from zero (0) to four (4); and wherein $m$ and $n$ are integers from zero (0) to one (1); which comprises gradually reacting a propargyl alcohol of the structure

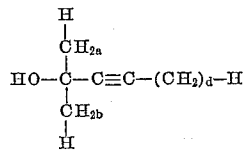

with a phosphorus compound of the structure

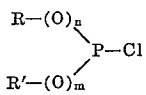

in the presence of a trialkyl amine at temperatures at which the resulting ester of a trivalent phosphorus acid is stable to spontaneous decomposition and gradually heating to effect a rearrangement.

3. A method of preparing a compound of the structure

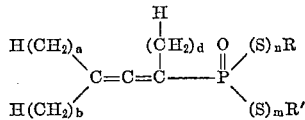

wherein R and R' are alkyl having from one to ten carbon atoms; wherein $n$ and $m$ are integers from zero (0) to one (1) provided not more than one is zero; and wherein $a$, $b$ and $d$ are integers from zero (0) to four (4); which comprises reacting a phosphorous compound of the structure

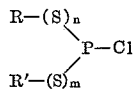

with a propargyl alcohol of the structure

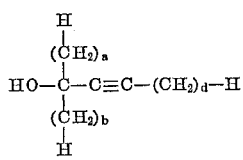

at a temperature at which the resulting ester of a trivalent phosphorus acid is stable to spontaneous decomposition and gradually heating to effect a rearrangement.

4. A compound of the structure

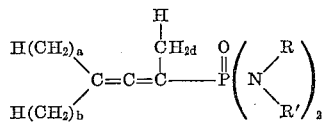

wherein R and R' are alkyl having from one to ten carbon atoms; wherein $a$, $b$ and $d$ are integers from zero (0) to four (4).

5. A method of preparing a compound of the structure

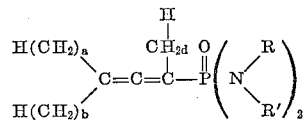

wherein R and R' are alkyl having from one to ten carbon atoms; wherein $a$, $b$ and $d$ are integers from zero (0) to four (4); which comprises reacting propargyl alcohol of the structure

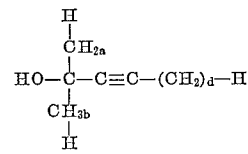

and a compound of the structure

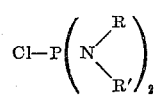

in the presence of a trialkyl amine at a temperature at which the resulting ester of a trivalent phosphorus acid is stable to spontaneous decomposition and gradually heating to effect a rearrangement.

6. A compound of the structure

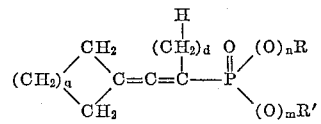

wherein R and R' are alkyl of up to ten carbon atoms; wherein $q$ is an interger from one (1) to five (5); wherein $m$ and $n$ are each integers from zero to one and wherein $d$ is an integer from zero (0) to four (4).

7. A method of preparing a compound of the structure

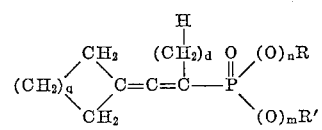

wherein R and R' are alkyl of up to ten carbon atoms; wherein $q$ is an integer from one (1) to five (5); and wherein $d$ is an integer from zero (0) to four (4); wherein $m$ and $n$ are each integers from zero to one which comprises reacting a compound of the structure

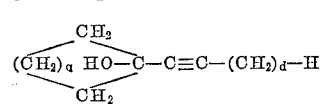

with

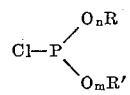

in the presence of a trialkyl amine, at a temperature at which the resulting ester of a trivalent phosphorus acid is stable ot spontaneous decomposition and gradually heating to effect a rearrangement.

8. A compound of the structure

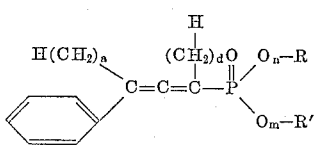

wherein R and R' are alkyl of from one to 10 carbon atoms; wherein $a$ and $d$ are integers from zero (0) to four (4); wherein $m$ and $n$ are integers from zero (0) to one (1).

9. The method of preparing a compound of the structure

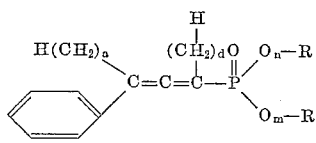

wherein R and R' are alkyl of from one to 10 carbon atoms; wherein $a$ and $d$ are integers from zero (0) to four (4); and wherein $m$ and $n$ are integers from zero (0) to one (1); which comprises reacting

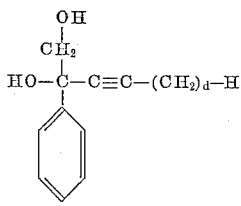

and

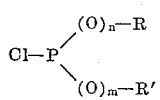

in the presence of a trialkyl amine at a temperature at which the resulting ester of a trivalent phosphorus acid is stable to spontaneous decomposition and gradually heating to effect a rearrangement.

in the presence of a trialkyl amine, at a temperature at which the resulting seter of a trivalent phosphorus acid is stable to spontaneous decomposition and gradually heating to effect a rearrangement.

10. Bis(2-propynyl)propadienylphosphonate.
11. S,S-dimethyl propadienylphosphonodithioate.
12. N,N,N',N' - tetramethylpropadienylphosphonic diamide.
13. Diethyl 2-cyclohexylidenevinylphosphonate.
14. The method of preparing diethyl propadienylphosphonate which comprises reacting diethyl phosphorochloridite and propjargyl alcohol in the presence of a trialkyl amine at a temperature at which the propargyl ester thus formed is stable and gradually heating to induce the rearrangement.
15. The method of preparing di-2-propynyl propadienylphosphonate which comprises reacting propargyl alcohol and phosphorus trichloride in the presence of a trialkyl amine at a temperature at which the propargyl ester is stable and gradually heating to induce hte rearrangement.

References Cited by the Examiner
UNITED STATES PATENTS

| | | | |
|---|---|---|---|
| 2,392,841 | 1/46 | Detrick | 260—461 |
| 2,957,905 | 10/60 | Gaertner | 260—461 |
| 3,071,609 | 1/63 | Campbell et al. | 260—461 |
| 3,112,271 | 11/63 | Calhoun | 260—461 |

OTHER REFERENCES

Pudovik: "Chem. Abstract," vol. 44, column 5800 (1950).

CHARLES B. PARKER, Primary Examiner.
MORRIS LIEBMAN, IRVING MARCUS, Examiners.